United States Patent
Kilgore

(10) Patent No.: US 12,005,663 B2
(45) Date of Patent: Jun. 11, 2024

(54) MOLDING ASSEMBLY AND METHODS OF USING THE SAME

(71) Applicant: NIKE, Inc., Beaverton, OR (US)

(72) Inventor: Bruce J. Kilgore, Lake Oswego, OR (US)

(73) Assignee: NIKE, Inc., Beaverton, OR (US)

( * ) Notice: Subject to any disclaimer, the term of this patent is extended or adjusted under 35 U.S.C. 154(b) by 349 days.

(21) Appl. No.: 17/241,509

(22) Filed: Apr. 27, 2021

(65) Prior Publication Data

US 2021/0339494 A1 Nov. 4, 2021

Related U.S. Application Data

(60) Provisional application No. 63/018,795, filed on May 1, 2020.

(51) Int. Cl.
*B29D 35/00* (2010.01)
*B29D 35/06* (2010.01)

(52) U.S. Cl.
CPC ....... *B29D 35/0063* (2013.01); *B29D 35/065* (2013.01)

(58) Field of Classification Search
None
See application file for complete search history.

(56) References Cited

U.S. PATENT DOCUMENTS

| 5,785,909 A | 7/1998 | Chang et al. |
| 6,132,663 A * | 10/2000 | Johnson ............ B29D 35/122 264/250 |
| 2011/0179668 A1 | 7/2011 | Fleming et al. |

FOREIGN PATENT DOCUMENTS

| CN | 202200559 U | 4/2012 | |
| CN | 107053722 A * | 8/2017 | ........... B29D 35/00 |
| CN | 109383060 A | 2/2019 | |
| KR | 10-2006-0004334 A | 1/2006 | |
| WO | 2019/064170 A1 | 4/2019 | |

OTHER PUBLICATIONS

Johnson 6132663 Full Document 2000 (Year: 2000).*
Xiao CN107053722 English Translation 2017 (Year: 2017).*
Fajin Chen, CN202200559 English Translation, 2012 (Year: 2012).*

* cited by examiner

*Primary Examiner* — Jacob T Minskey
*Assistant Examiner* — Adrien J Bernard
(74) *Attorney, Agent, or Firm* — Shook, Hardy & Bacon L.L.P.

(57) ABSTRACT

A molding assembly having a top mold member and a base mold member. The top mold member can include a first top mold portion and a second top mold portion that shift between a top mold open configuration and a top mold closed configuration by rotating about a top mold hinge axis. The molding assembly can shift between a molding assembly open configuration and a molding assembly closed configuration by rotating at least the top mold member about a molding assembly hinge axis.

17 Claims, 8 Drawing Sheets

MOLDING ASSEMBLY AND METHODS OF USING THE SAME

CROSS-REFERENCE TO RELATED APPLICATIONS

This application claims priority to U.S. provisional application No. 63/018,795, filed on May 1, 2020, entitled: "MOLDING ASSEMBLY AND METHODS OF USING THE SAME," the entire contents of which are hereby incorporated by reference herein.

TECHNICAL FIELD

The present disclosure relates to molding assemblies. More particularly, the present disclosure relates to molding assemblies for forming at least a part of an article of footwear.

BACKGROUND

Conventional processes for making an article of footwear can include joining a bottom unit to a footwear upper. However, certain systems and processes for joining the bottom unit to a footwear upper can be resource intensive in that such processes may utilize several processing steps and/or multi-component, large machinery. Further, due to the resource intensive nature of such systems and processes, there is a significant manufacturing cost and an increased risk of potential for errors.

BRIEF DESCRIPTION OF THE DRAWINGS

Illustrative aspects are described in detail below with reference to the attached drawing figures, which are incorporated by reference herein and wherein.

DESCRIPTION

Figure 1A:
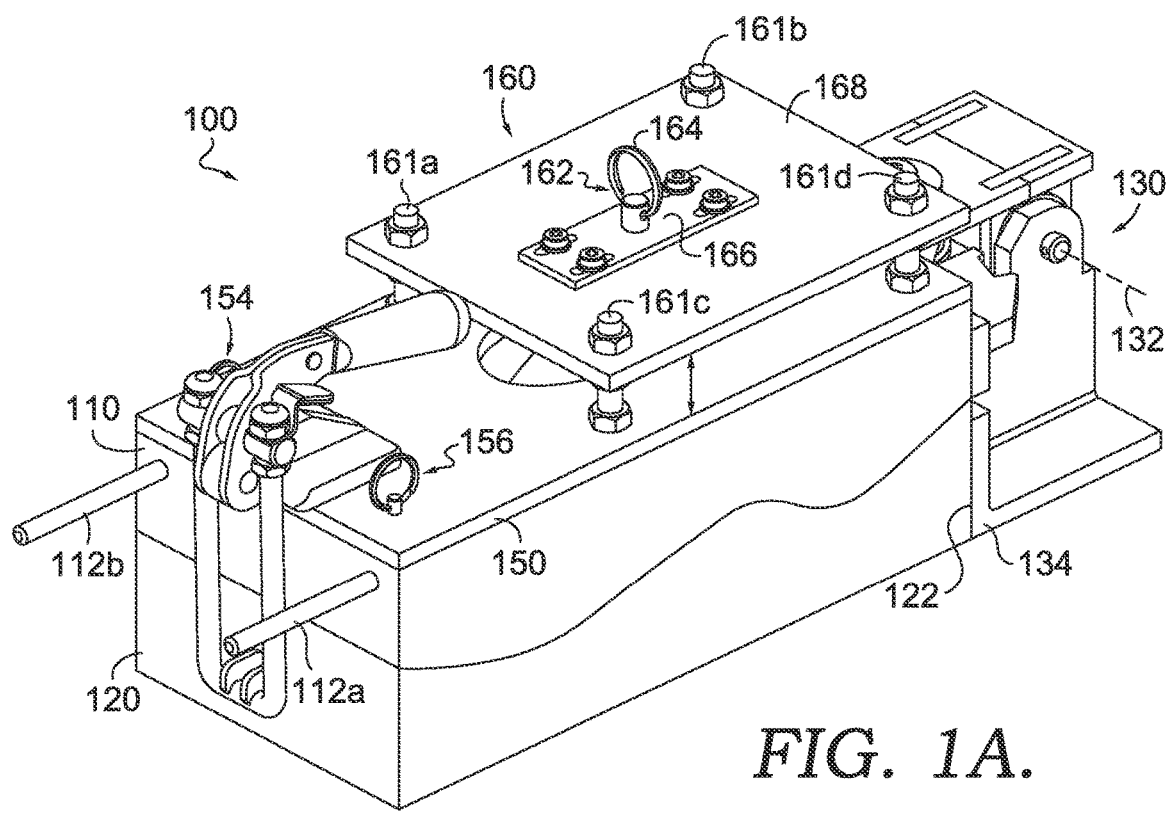
FIG. 1A depicts a front and side perspective view of a molding assembly in a molding assembly closed configuration, in accordance with aspects hereof.

Aspects herein relate to molding assemblies and methods of using the same. In certain aspects, the molding assemblies described herein can be utilized to join at least a portion of a bottom unit to a footwear upper in forming an article of footwear.

Certain conventional systems and processes for joining a bottom unit to a footwear upper for an article of footwear can be resource intensive. For example, certain conventional systems and processes that utilize an adhesive to join a bottom unit to a footwear upper require multiple processing steps to prepare and apply the adhesive, as well as certain machinery to ensure the proper placement of the adhesive, and the subsequent joining of the footwear upper and bottom unit. Other certain conventional systems can form all or part of the bottom unit onto the footwear upper, relying on mechanical engagement between the formed bottom unit and footwear upper, a process generally called direct attach or direct bottoming. However, such conventional systems can require large, complex mechanical systems, requiring significant space and multiple process steps. For instance, certain conventional direct attach systems can utilize an oversized molding system in order to accommodate molding inserts for differing footwear article sizes and/or styles. More particularly, such oversized molding systems can include a large hinged mechanism or press for housing an interchangeable molding insert. Due to the large press size and its significant mass, such a hinge mechanism may include a hinge assembly positioned at a significant distance from the bottom unit mold to reduce the forces required for a user to open and close the assembly, thereby requiring significantly large spaces for housing such systems in a manufacturing facility. Further, the significant mass of a portion of the hinge assembly rotating about the hinge can cause substantial wear on the hinge, which can reduce the functional life of such machinery and/or introduce errors in the manufacturing process though misalignment of the molds and/or articles. Additionally, the large press size and its significant mass can render such an oversized molding system difficult to operate, and the many steps required for interchanging the molding insert pieces for various sizes, can further increase the likelihood for manufacturing errors.

The molding assemblies described herein can alleviate one or more of the problems mentioned above. For example in certain aspects, the molding assemblies described herein include a molding assembly with a top mold member, a base mold member, and a molding assembly hinge mechanism that is coupled or attached to at least the base mold member. In aspects, the top mold member can rotate, via the molding assembly hinge mechanism, about a molding assembly hinge axis toward and away from the base mold member to shift between a molding assembly open configuration and a molding assembly closed configuration. In such aspects, since the molding assembly itself includes the molding assembly hinge mechanism, e.g., one or more of the molding members are coupled or attached to the molding assembly hinge mechanism, the molding assemblies disclosed herein, in aspects, may not require the additional processing steps of changing out molds for various article styles and/or sizes, thereby reducing the possibility for manufacturing errors. Further in certain aspects, due to the compact design and function of the molding assemblies disclosed herein, an oversized press with a hinge mechanism positioned a significant distance from the molds is not required, thus leading to a reduced machinery footprint.

In certain aspects as discussed further below, the molding assemblies disclosed herein can also include a top mold member having two portions that rotate about a top mold hinge axis via a top mold hinge mechanism that is coupled or attached to the top mold member. In such aspects, the top mold hinge axis and the molding assembly axis discussed above can be positioned within about 15 centimeters of one another, further facilitating the compact design of the molding assemblies described herein. The positioning of the top mold hinge axis and the molding assembly axis within 15 centimeters of one another reduces the footprint, mass, and expense of the molding assemblies as compared to traditional arrangements with a universal press onto which cumbersome mold portions are attached that are adapted to coordinate with the universal press. Further, with a self-contained molding assembly as provided herein, any number of molding assemblies may be leveraged at a given time. This is not commercially possible with a traditional solution where there is a limited number of universal press positions to which a finite number of mold portions may be joined with the universal press.

In various aspects, the molding assemblies disclosed herein can further include a top plate that can include one or more top mold securing mechanisms to ensure the top mold is correctly positioned in a top mold closed configuration. In such aspects, the one or more top mold securing mechanisms can facilitate alignment of first and second portions of the top mold member in the proper orientation for the molding operation, thereby further reducing the risk of manufacturing errors.

Accordingly in one aspect, a molding assembly is provided. The molding assembly can include a base mold member and a top mold member. The top mold member can include a first top mold portion and a second top mold portion, where the first top mold portion and the second top mold portion are rotatable, about a top mold hinge axis, between a top mold open configuration and a top mold closed configuration. At least the top mold member is rotatable, about a molding assembly hinge axis, between a molding assembly open configuration and a molding assembly closed configuration. When in the molding assembly closed configuration, the base mold member and the top mold member in the top mold closed configuration, are cooperatively adapted to form at least a portion of a mold surface for an article. The top mold hinge axis and the molding assembly hinge axis are positioned within 15 centimeters of one another to ensure a low mass, self-contained molding assembly.

In another aspect, a molding assembly is provided. The molding assembly can include a base mold member and a top mold member. The top mold member can include a first top mold portion and a second top mold portion, where the first top mold portion and the second top mold portion are rotatable, about a top mold hinge axis, between a top mold open configuration and a top mold closed configuration. The molding assembly can further include a top plate that includes one or more top mold member securing mechanisms adapted to secure the top mold member in the top mold closed configuration. At least the top mold member is rotatable, about a molding assembly hinge axis, between a molding assembly open configuration and a molding assembly closed configuration. When in the molding assembly closed configuration, the base mold member and the top mold member in the top mold closed configuration, are cooperatively adapted to form at least a portion of a mold surface for an article. When in the molding assembly closed configuration, the top mold member is positioned between the top plate and the base mold member.

In yet another aspect, a method for utilizing a molding assembly is provided. The method can include a step of securing an article to a top plate using one or more article securing mechanisms. The method can further include rotating one or both of a first top mold portion and a second top mold portion of a top mold member about a top mold hinge axis from a top mold open configuration to a top mold closed configuration. The method can also include rotating the top mold member in the top mold closed configuration, the top plate, and the article, about a molding assembly hinge axis, toward a base mold member into a molding assembly closed configuration, where the top mold hinge axis and the molding assembly hinge axis are positioned within 15 centimeters of one another.

As discussed above, aspects herein are directed to molding assemblies that can be utilized to join at least a portion of a bottom unit to a footwear upper, e.g., using a direct attach process, for forming at least part of an article of footwear. The direct attach process will be discussed further below.

An article of footwear, e.g., shoe, cleat, sandal, slipper, and boot, and the like, is comprised of one or more components. In the examples provided herein, a footwear upper and a bottom unit may form the article of footwear. A footwear upper, or referred to as an upper for short, is a foot-securing component of the footwear. The upper extends from the bottom unit and secures the bottom unit to a foot of a wearer. The upper may be formed from a variety of materials, such as leather, knit, woven, braided, felted, non-woven, and the like. Similarly, an upper may be made from a single material or a variety of materials. The upper may be a continuous material, a discontinuous material, a cut-and-sew combination, a cut-and-adhere combination, and the like. Therefore in this disclosure, it is contemplated herein that an upper may be formed from a variety of materials (e.g., organic, non-organic) and/or techniques.

A bottom unit is generally positioned between a wearer's foot and the ground. A bottom unit may be referred to as a sole. A bottom unit may be formed from one or more discrete components, such an inner sole, a midsole, an outsole, or a combination thereof. The components of a bottom unit may be formed from a variety of materials. Those materials include, but are not limited to, polymer-based materials (e.g., polyurethane ("PU"), thermoplastic polyurethane ("TPU"), silicone, ethylene-vinyl acetate ("EVA"), polypropylene), rubber, and other materials suitable for use as a bottom unit. The polymer-based materials may be foamed and/or expanded in some examples.

The direct attach process, for purposes of the present disclosure, includes the formation of at least a portion of the sole with the upper present and results in the sole being joined with the upper as part of the sole forming operation. For example, in aspects, this process can include a molding operation where a polymeric composition, which may be a to-be foamed polymeric composition, is injected or poured into a mold cavity wherein a plantar portion (e.g., under foot portion) of the upper is positioned at the mold cavity. In aspects, the polymeric composition can interact with the plantar region of the upper to form at least a mechanical engagement between the polymeric composition and the upper material. As the polymeric composition hardens and/or cures, the physical engagement between the polymeric composition and the upper forms a bond coupling the two together with sufficient bond strength for use as an article of footwear. In certain aspects, a foamed polymeric composition may further expand in the mold thereby further mechanically engaging the upper as it hardens and/or cures. As discussed above, the direct attach process can eliminate the use of an adhesive, in some aspects. Further, as the sole is molded in the presence of the upper, alignment, size, and fit of the sole and upper are better ensured.

Figure 1B:
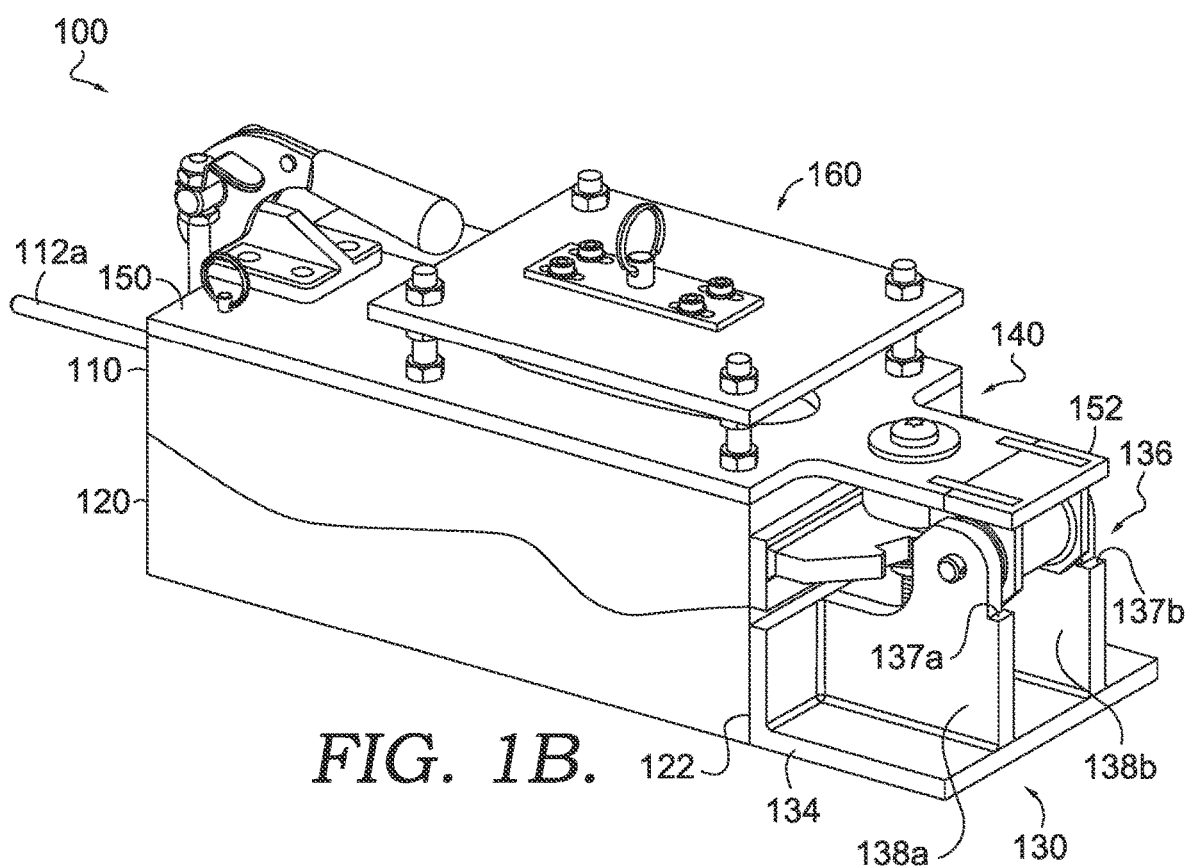
FIG. 1B depicts a rear and side perspective view of the molding assembly of FIG. 1A in the molding assembly closed configuration, in accordance with aspects hereof.

FIGS. 1A and 1B depict a molding assembly 100 according to various aspects disclosed herein. It should be understood that the molding assembly 100 of FIGS. 1A and 1B is one example of a molding assembly and that variations of the molding assembly 100 are also contemplated by the present disclosure. In the aspect depicted in FIGS. 1A and 1B, the molding assembly 100 includes a top mold member 110, a base mold member 120, a molding assembly hinge mechanism 130, a top mold hinge mechanism 140, and a top plate 150.

In the aspect depicted in FIGS. 1A and 1B, the molding assembly 100 is in a molding assembly closed configuration. In aspects, the molding assembly hinge mechanism 130 can be configured to shift the molding assembly 100 between the molding assembly closed configuration, depicted in FIGS. 1A and 1B, and a molding assembly open configuration, such as that depicted in FIG. 2A. In such aspects, the molding assembly hinge mechanism 130 can be configured to shift the top mold member 110 towards and away from the base mold member 120 about a molding assembly hinge axis 132. In aspects, the molding assembly hinge mechanism 130 can be any convenient hinge mechanism that can rotate the top mold member 110 towards and away from the base mold member 120.

As discussed above, the molding assemblies disclosed herein can be compact, self-contained molding assemblies that, in aspects, may not require the use of a large hinged press holding/positioning individual molding portions and/or require the additional processing steps of changing out molds for various article styles and/or sizes. For instance as discussed above, in aspects, the molding assembly hinge mechanism 130 can be coupled, e.g., fixedly coupled, to one or more of the other components of molding assembly 100, thereby positioning an axis of rotation of the top mold member 110 in close proximity to the molding members, e.g., the top mold member 110 and the base mold member 120. In the aspect depicted in FIGS. 1A and 1B, the molding assembly hinge mechanism 130 can be fixedly coupled to the base mold member 120. As can be seen in FIGS. 1A and 1B, the molding assembly hinge mechanism 130 can include a molding assembly hinge base member 134 that is coupled, e.g., fixedly coupled, to an end 122 of the base mold member 120. In aspects, the molding assembly hinge base member 134 can be fixedly coupled to the base mold member 120 using any convenient coupling mechanism, including but not limited to the use of fasteners, such as bolts and/or screws, welding, or any other mechanical fastening mechanism.

Figure 2A:
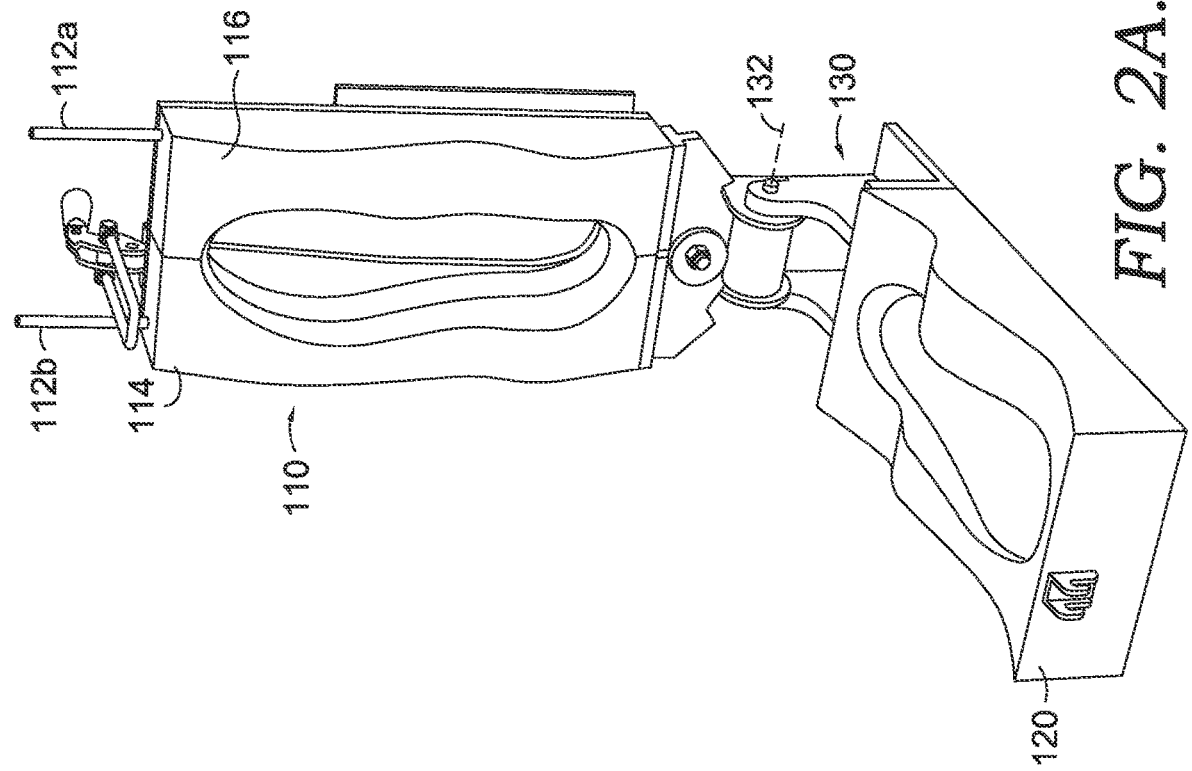
FIGS. 2A and 2B depict the molding assembly of FIGS. 1A and 1B in a molding assembly open configuration, in accordance with aspects hereof.

As discussed above, in various aspects, the molding assembly hinge mechanism 130 can be configured to shift the top mold member 110 towards and away from the base mold member 120, for shifting between the molding assembly closed configuration, depicted in FIGS. 1A and 1B, and the molding assembly open configuration, such as that depicted in FIG. 2A. Since, in aspects, the molding assemblies disclosed herein can exhibit a compact, minimal design and reduced mass compared to certain conventional systems, machinery may not be necessary to shift the top mold member 110 towards and away from the base mold member 120. For instance, in the aspect depicted in FIGS. 1A, 1B, and 2A, a user may manually move the top mold member 110 via the use of one or more movement members 112a and 112b. In certain aspects, such as that depicted in FIGS. 1A, 1B, and 2A, the one or more movement members 112a and 112b can be coupled to the top mold member 110, or can be integral with the top mold member 110, or may be coupled to another component of the molding assembly, e.g., the top plate 150.

Figure 2B:
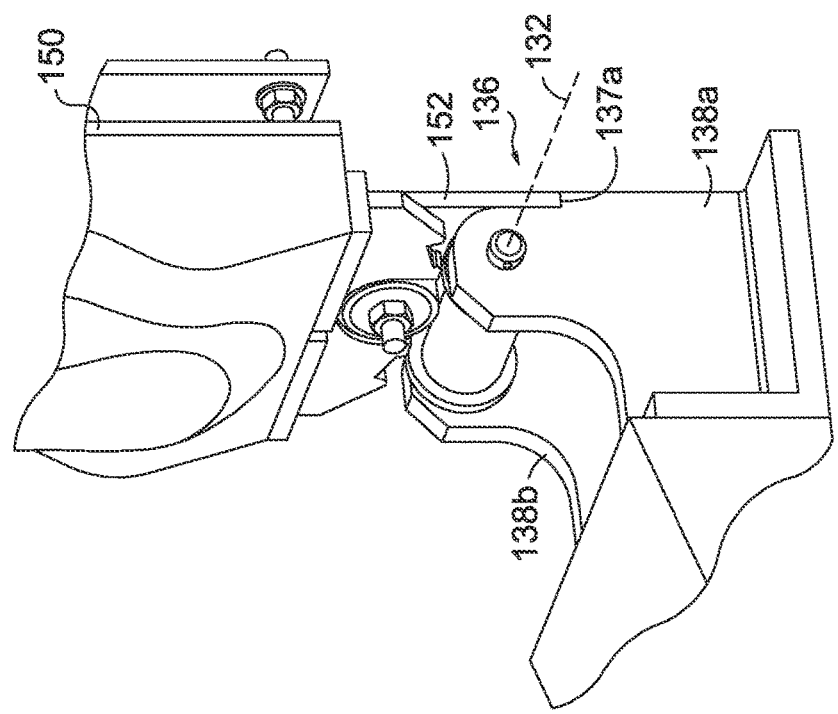

As best seen in FIGS. 1A, 2A, and 2B and as discussed above, in aspects, when shifting from the molding assembly closed configuration to the molding assembly open configuration, the top mold member 110 can shift about a molding assembly hinge axis 132. As mentioned above, in various aspects, the molding assemblies disclosed herein may not require additional machinery to facilitate the opening and closing of the molding assemblies. In certain aspects, the molding assembly 100 can include a first positive stop mechanism 136 to limit the range of motion of the molding assembly hinge mechanism 130. In such aspects, the first positive stop mechanism 136 may restrict the backward movement of the top mold member 110 away from the base mold member 120. As best seen in FIGS. 1B and 2B, the first positive stop mechanism 136 can include notches 137a and 137b in molding hinge securing members 138a and 138b, respectively. In such aspects, as the top mold member 110 is shifting back away from the base mold member 120, a top plate extension member 152 can engage the notches 137a and 137b, or another portion of the molding hinge securing members 138a and 138b, such that the top plate 150 and the top mold member 110 are prevented from shifting further backward. In such aspects, this limited range of motion of the molding assembly hinge mechanism 130 can reduce wear on the hinge and/or minimize overextension of the hinge. In the same or alternative aspects, the first positive stop mechanism 136 can aid in maintaining the molding assembly 100 in an molding assembly open configuration, providing a resting position for the top mold member 110, in order to secure an article, e.g., a lasted upper, to the molding assembly 100, as discussed further below.

Figure 2C:
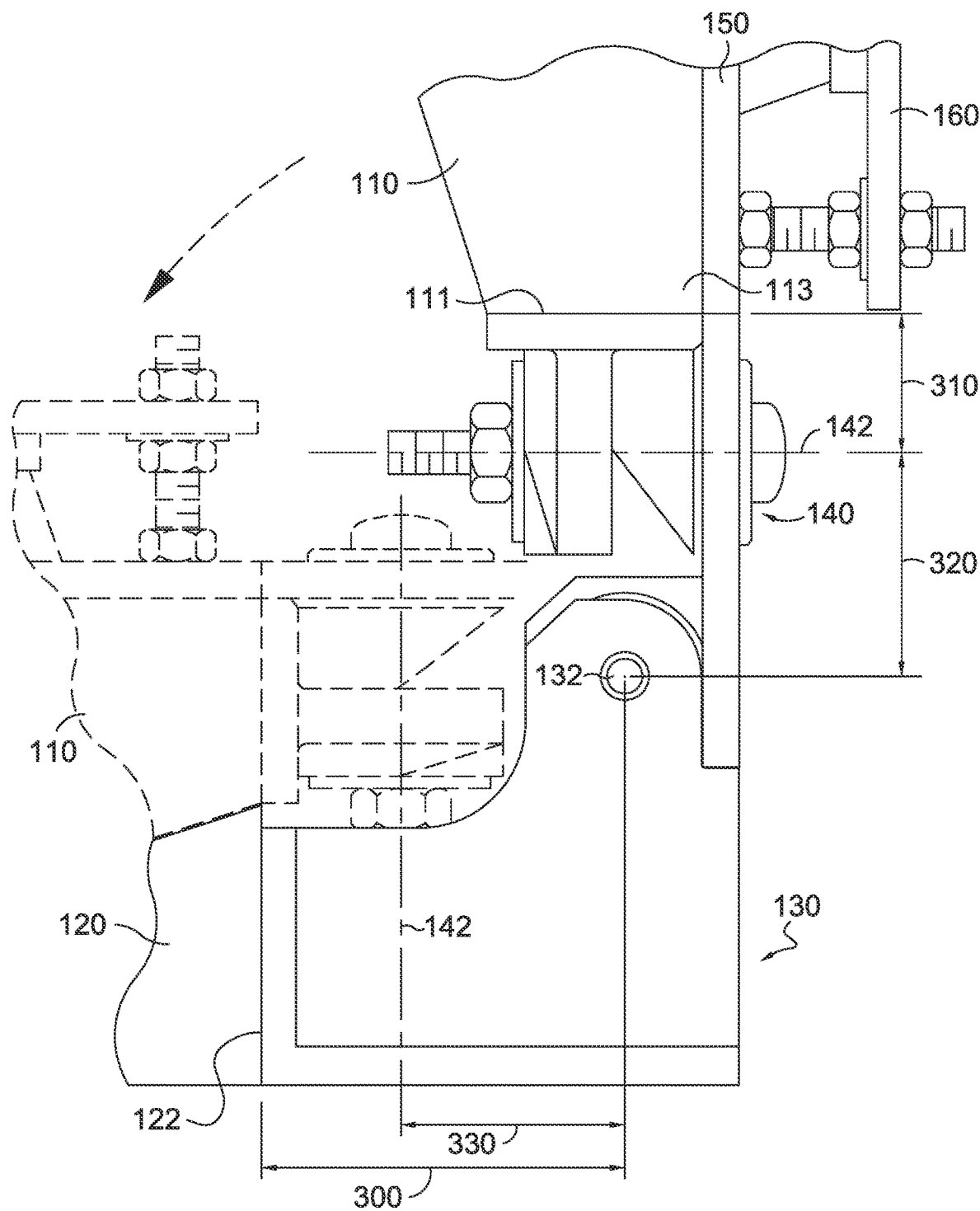
FIG. 2C depicts the molding assembly of FIGS. 2A and 2B in the molding assembly open configuration, and showing in phantom a portion of the molding assembly in the molding assembly closed configuration, in accordance with aspects hereof.

In aspects, when the molding assembly 100 is in the molding assembly open configuration, at least a portion of the molding assembly 100 can be positioned past the molding assembly hinge axis 132, e.g., in order to aid in maintaining the molding assembly 100 in the molding assembly open configuration. In such aspects, this may at least partly provide mass balance about the molding assembly hinge axis 132, which may more effectively facilitate maintaining the molding assembly 100 in an open configuration. For instance, as best seen in the aspect depicted in FIG. 2C, the top plate 150 can be laterally positioned on an opposite side of the molding assembly hinge axis 132 than the base mold member 120. As also can be seen in FIG. 2C, at least a portion 113 of the top mold member 110 can be laterally positioned on an opposite side of the molding assembly hinge axis 132 than the base mold member 120.

Figure 3A:
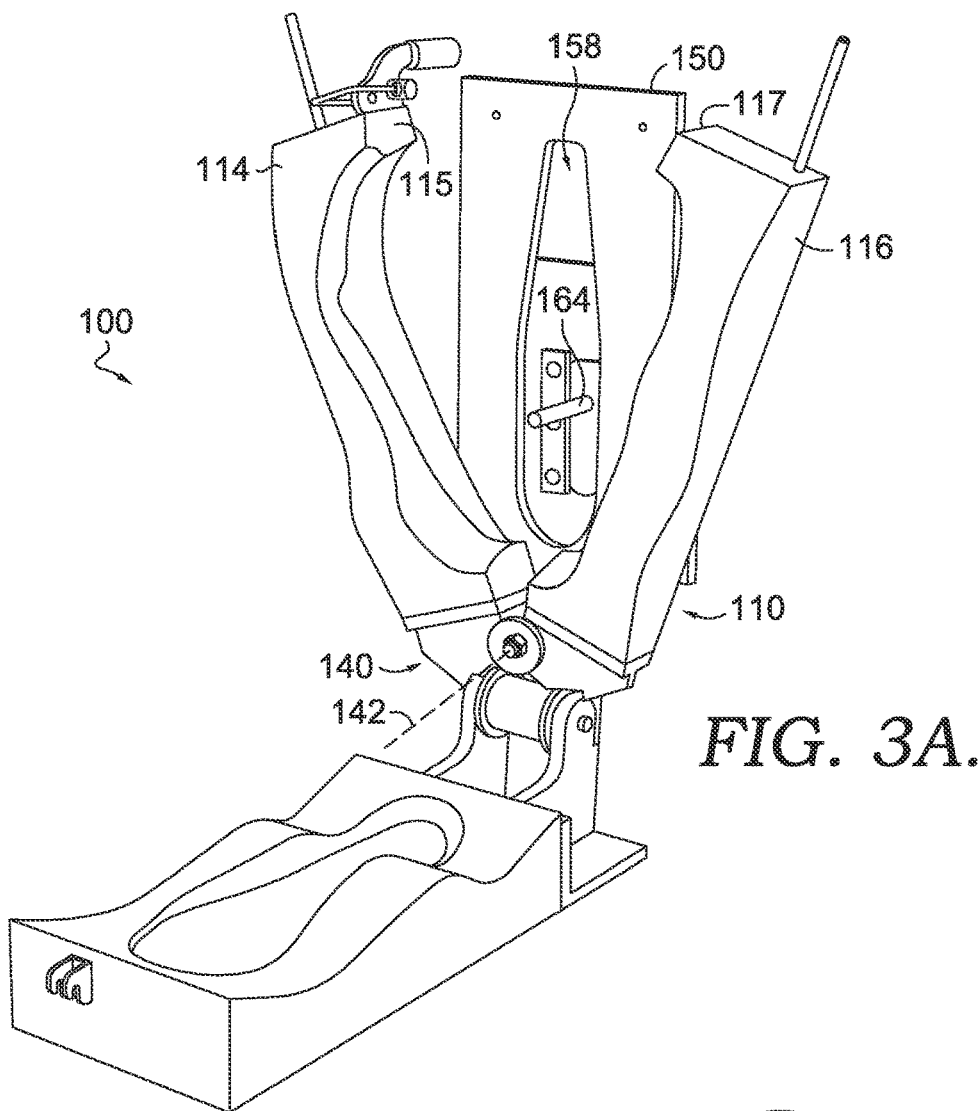
FIGS. 3A and 3B depict the molding assembly of FIGS. 1A and 1B in a top mold open configuration, in accordance with aspects hereof.
Figure 3B:
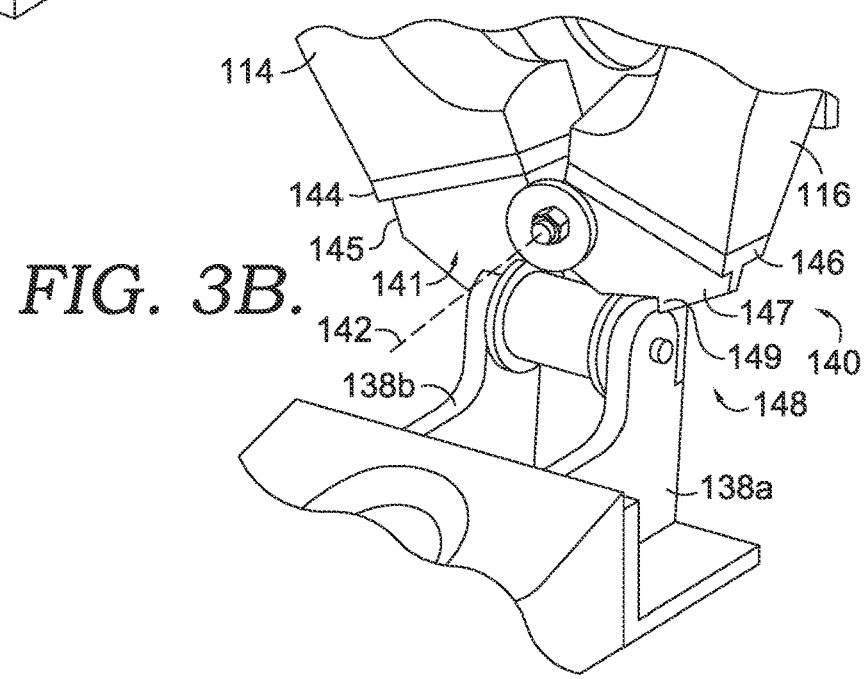

Turning now to FIGS. 3A and 3B, the molding assembly 100 is depicted in the molding assembly open configuration, and also in the top mold open configuration. The molding assembly open configuration, and molding assembly closed configuration, were discussed above with respect to FIGS. 1A and 1B. As best seen in FIG. 3A, in the top mold open configuration, a first top mold portion 114 and a second top mold portion 116 of the top mold member 110 are at least partly spaced apart from one another. FIG. 2A depicts the top mold member 110 in the top mold closed configuration, where the first top mold portion 114 and a second top mold portion 116 are adjacent one another, and in aspects, may be contacting one another along the side surfaces 115 and 117, respectively.

In various aspects, the molding assembly 100 is adapted to shift the top mold member 110 between the top mold closed configuration, such as that depicted in FIG. 2A, and the top mold open configuration, such as that depicted in FIG. 3A, by rotating via a top mold hinge mechanism 140 about a top mold hinge axis 142. In aspects, the top mold hinge mechanism 140 can be any convenient hinge mechanism that can rotate the first top mold portion 114 and a second top mold portion 116 towards and away one another.

In aspects, one feature of the compact, self-contained molding assemblies described herein is that the top mold hinge mechanism 140 can be coupled to at least a portion of the molding assembly 100. For instance, as best seen in FIG. 3B, the top mold hinge mechanism 140 can include a first top mold hinge base member 144 coupled, e.g., fixedly coupled, to the first top mold portion 114, and a second top mold hinge base member 146 can be coupled to the second top mold portion 116, e.g., fixedly coupled. Further, in aspects, a first hinge plate 145 can be coupled, e.g., fixedly coupled, to the first top mold hinge base member 144, and a second hinge plate 147 can be coupled, e.g., fixedly coupled, to the second top mold hinge base member 146. In aspects, the first top mold hinge base member 144 and the first hinge plate 145 can be integral, or a single component, and similarly, the second top mold hinge base member 146 and the second hinge plate 147 can be integral, or a single component. In aspects, in operation, as the first top mold portion 114 and the second top mold portion 116 shift toward or away from one another, the first hinge plate 145 and the second hinge plate 147 rotate about the top mold hinge axis 142.

In aspects, when shifting from the top mold closed configuration to the top mold open configuration, the first top mold portion 114 and a second top mold portion 116 rotate about a top mold hinge axis 142. As discussed above, in various aspects, the molding assemblies disclosed herein may not require additional machinery to facilitate the opening and closing of the molding assemblies. In such aspects, the molding assemblies disclosed herein may include additional structural features to facilitate a desired range of motion and/or to facilitate maintaining the molding assemblies in a desired configuration, e.g., for loading and/or unloading an article. For instance, as best seen in the aspect depicted in FIG. 3B, the molding assembly 100 can include a second positive stop mechanism 148 that may restrict the backward movement of the first top mold portion 114 and the second top mold portion 116 away from one another. In operation, as the second top mold portion 116 is rotating about the top mold hinge axis 142 away from the first top mold portion 114, a portion 149 of the second hinge plate 147 may contact the molding hinge securing member 138a, in aspects, thereby preventing the second top mold portion 116 from shifting or rotating further outward or away from the first top mold portion 114. In the same or alternative aspects, a portion 141 of the first hinge plate 145 may contact the molding hinge securing member 138b, in aspects, thereby preventing the first top mold portion 114 from shifting or rotating further outward or away from the second top mold portion 116. In aspects, the limited range of motion of the top mold hinge mechanism 140, e.g., via the second positive stop mechanism 148, can minimize wear on the hinge and/or overextension of the hinge. In the same or alternative aspects, the second positive stop mechanism 148 can facilitate in maintaining the molding assembly 100 in an top mold open configuration, providing a resting position for the first top mold portion 114 and the second top mold portion 116, in order to secure an article, e.g., a lasted upper, to the molding assembly 100, as discussed further below.

In aspects, the molding assemblies disclosed herein are configured to be compact, self contained molding assemblies, e.g., a large, oversized press, or other oversized hinged mechanisms may not be required for the manual opening and closing of the molding assemblies, at least because the molding assembly hinge mechanism 130 and/or the top mold hinge mechanism 140 are coupled to one or more of the base mold member 120, the top mold member 110, and the top plate 150. That is, the hinge mechanisms that are utilized for the opening and closing of molding assemblies disclosed herein, in aspects, are coupled to the individual molding members themselves instead of being coupled to a large press or other complex machinery that can include interchangeable molding inserts. For instance, as best seen in the aspect depicted in FIG. 2C, the molding assembly hinge axis 132 of the molding assembly hinge mechanism 130 can be positioned relative to the end 122 of the base mold member 120 by a distance 300, where the distance 300 is: between about 1 centimeter (cm) and about 30 cm, between about 2 cm and about 20 cm, or between about 2 cm and about 15 cm; or less than about 25 cm, or less than 20 cm.

In aspects, as best seen in FIG. 2C, when in the top mold closed configuration, the top mold hinge axis 142 of the top mold hinge mechanism 140 can be positioned relative to the end 111 of the top mold member 110 by a distance 310, where the distance 310 is: between about 1 cm and about 20 cm, between about 2 cm and about 15 cm, or between about 2 cm and about 10 cm; or less than about 20 cm, or less than 15 cm.

In various aspects, as best seen in FIG. 2C, when the molding assembly 100 is in the molding assembly open configuration, the top mold hinge axis 142 can be positioned relative to the molding assembly hinge axis 132 by a distance 320, where the distance 320 is: between about 1 cm and about 30 cm, between about 2 cm and about 20 cm, or between about 2 cm and about 15 cm; or less than about 25 cm, or less than 20 cm.

FIG. 2C also depicts, in phantom, an alternate position where the top mold member 110 shifted down towards the base mold member 120 into the molding assembly closed configuration. In aspects, when the molding assembly 100 is in the molding assembly closed configuration, the top mold hinge axis 142 can be positioned relative to the molding assembly hinge axis 132 by a distance 330, where the distance 330 is: between about 1 cm and about 30 cm, between about 2 cm and about 20 cm, or between about 2 cm and about 15 cm; or less than about 25 cm, or less than 20 cm.

In aspects, the molding assemblies disclosed herein, e.g., the molding assembly 100, can include components that further facilitate securing an article to the molding assembly 100. For instance, the molding assembly 100 can include an article securing mechanism 160, as can be seen in the aspect depicted in FIGS. 1A and 1B. In aspects, the article securing mechanism 160 is positioned on top of the molding assembly 100. In the same or alternative aspects, the top plate 150 and/or the top mold member 110 are positioned between the article securing mechanism 160 and the base mold member 120.

In aspects, at least a portion of the article securing mechanism 160 can secure an article in position for the molding process. For instance, the article securing mechanism 160 can include an article engaging component 162 having a securing pin 164 coupled to a securing plate 166. In aspects, as discussed further below, the securing pin 164 can be received inside a portion of the article, e.g., inside a portion of a last of a lasted footwear upper, and a securing plate 166 can secure the securing pin 164 and article to the molding assembly 100, e.g., by engaging an adjustment plate 168. It should be understood that while the securing pin 164 and the securing plate 166 are depicted as separate components, in other aspects, the securing pin 164 and the securing plate 166 can be integral or one single component. It should also be understood that in various aspects, the securing plate 166 may be absent and the securing pin 164 or other securing component may engage the adjustment plate 168.

Since, in aspects, the molding surfaces of the base mold member 120 and the top mold member 110 are in a fixed positioned, the molding assembly 100 can be configured to adjust the vertical position of the article to ensure that the molding surfaces are in a desired location with respect to the article. For example in aspects, the adjustment plate 168 can vertically shift relative to the top plate 150, and the top mold member 110 and the base mold member 120, thereby moving an article secured thereto to a desired position with respect to the molding surfaces of the top mold member 110 and the base mold member 120. In various aspects, the adjustment plate 168 can vertically adjust the position of an article secure thereto using any convenient mechanism. In one example aspect, such as that depicted in FIG. 1A, the adjustment plate 168 can be shiftably coupled to the top plate 150 via the fasteners 161a-161d. In operation, the adjustment plate 168, and an article secured thereto, can be vertically shifted towards or away from the top plate 150 by adjusting the vertical position of the adjustment plate 168 and securing the adjustment plate 168 in a desired vertical position using the fasteners 161a-161d.

Figure 8:
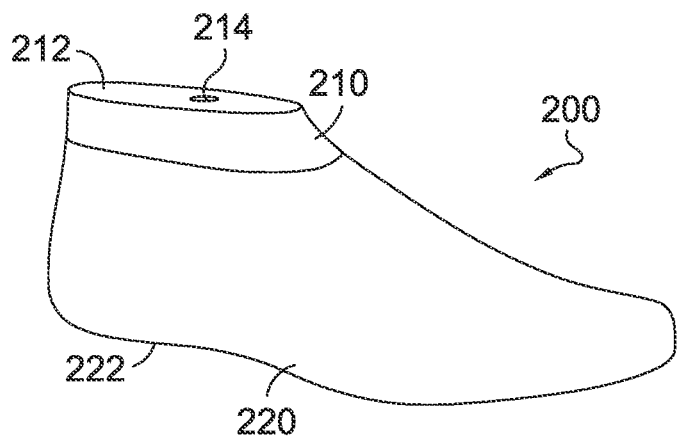
FIG. 8 depicts a lasted footwear upper, in accordance with aspects hereof.

Aspects of the molding assembly 100 will now be described in the context of securing an article within the molding assembly 100 and securing the molding assembly 100 for the molding process, e.g., a direct attach process. The article discussed in these aspects is comprised of a lasted footwear upper, such as the lasted footwear upper 200 depicted in FIG. 8. It should be understood that while a lasted footwear upper is described herein other articles, other components of footwear articles, or portions of a footwear upper are also contemplated by the disclosure herein. As can be seen in FIG. 8, the lasted footwear upper 200 can include a last 210 and a footwear upper 220 positioned on the last 210.

Figure 4:
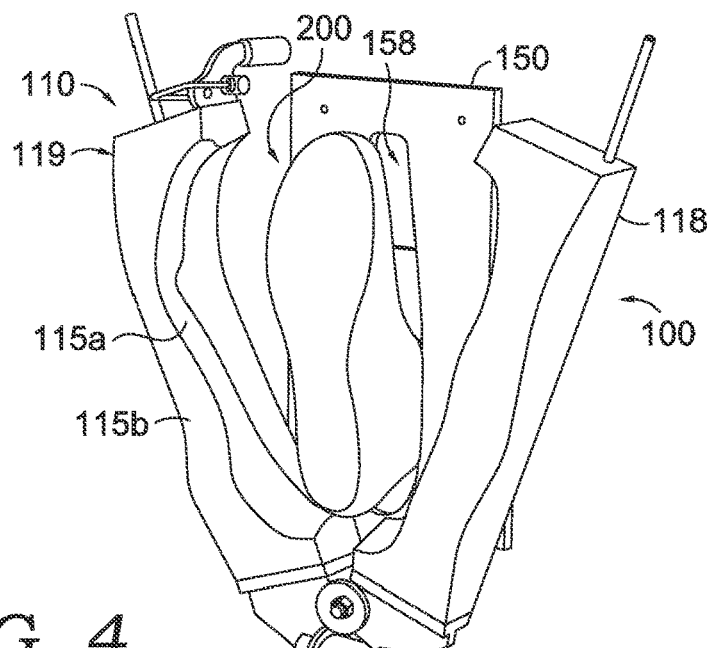
FIG. 4 depicts the molding assembly of FIG. 3A with a lasted footwear upper secured to the molding assembly and with the top mold member in the top mold open configuration, in accordance with aspects hereof.
Figure 4:
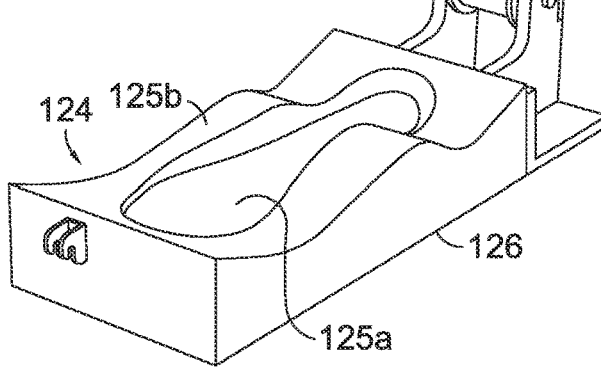
Figure 7:
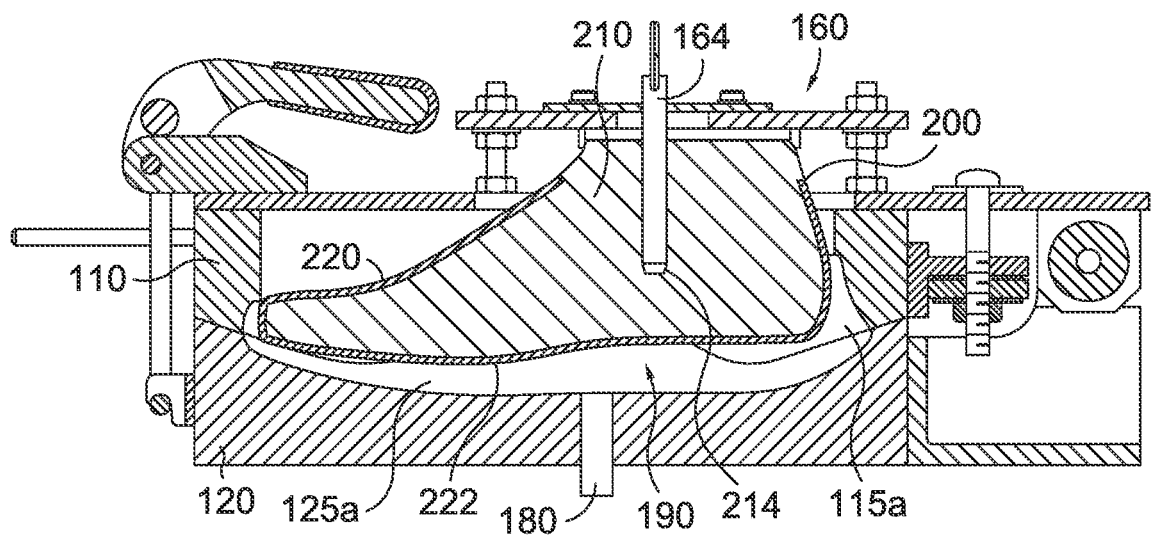
FIG. 7 depicts the molding assembly of FIG. 4 with a lasted footwear upper secured to the molding assembly with the molding assembly in the molding assembly closed configuration, with a portion of the molding assembly cutaway to reveal a molding surface, in accordance with aspects hereof.

In aspects, a lasted footwear upper, e.g., the lasted footwear upper 200, can be secured to the molding assembly 100 when the molding assembly 100 is in the molding assembly open configuration and when the top mold member 110 is in the top mold open configuration, such as that depicted in FIG. 3A. In such aspects, as seen in FIG. 3A, the top plate 150 can include an aperture 158 allowing for at least a portion of the article securing mechanism 160, e.g., the securing pin 164, to extend past the top plate 150 and towards the top mold member 110. In aspects, a top portion 212 of the lasted footwear upper 200 can engage the securing pin 164 by inserting the securing pin 164 into a recess 214 in the last 210. FIG. 7 depicts a cross-section of the lasted footwear upper 200 secured to the article securing mechanism 160 with the securing pin 164 positioned in the recess 214 of the last 210. FIG. 4 depicts the lasted footwear upper 200 secured to the article securing mechanism 160 when the molding assembly 100 is in the molding assembly open configuration and when the top mold member 110 is in the top mold open configuration. In operation, the top portion 212 of the lasted footwear upper 200 can be inserted through the aperture 158 of the top plate 150 and engage the article securing mechanism 160 for securing the lasted footwear upper 200 thereto.

Figure 5:
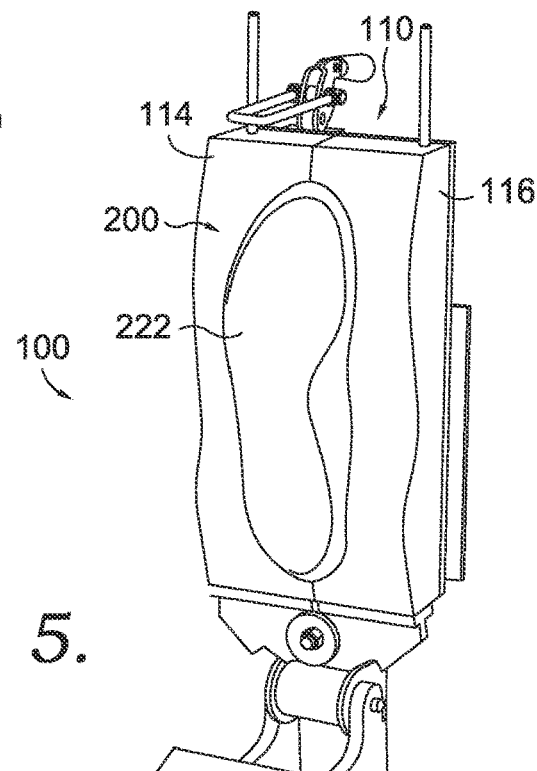
FIG. 5 depicts the molding assembly of FIG. 4 with a lasted footwear upper secured to the molding assembly and with the top mold member in the top mold closed configuration, in accordance with aspects hereof.
Figure 5:
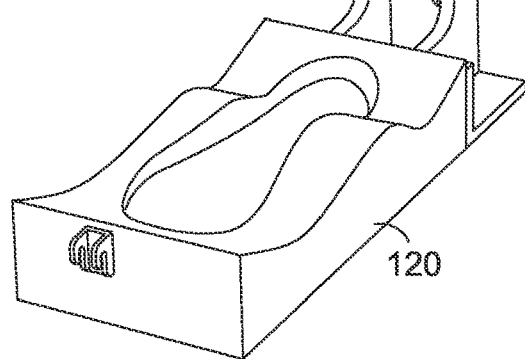

In aspects, once the article, e.g., the lasted footwear upper 200, is secured to the molding assembly 100, e.g., via the article securing mechanism 160, the molding assembly 100 can be shifted to a fully closed configuration. For instance, the top mold member 110 can shift from the top mold open configuration, such as that depicted in FIG. 4, to a top mold closed configuration, such as that depicted in FIG. 5. As can be seen in the aspect depicted in FIG. 5, the first top mold portion 114 and the second top mold portion 116 have shifted towards one another and at least partly enclose a portion of the lasted footwear upper 200, with at least the plantar portion 222 exposed. In aspects, the top mold member 110 can be shifted down towards the base mold member 120 into the molding assembly closed configuration, such as that depicted in FIGS. 1A and 1B.

The molding assemblies described herein can include one or more features to aid in securing the molding assembly, e.g., the molding assembly 100, in the closed configuration, and/or so that the top mold member 110, the base mold member 120, and the article are properly aligned for the molding process. The proper securement of the molding assembly in the closed configuration and the proper alignment of the article can, in aspects, help minimize manufacturing errors.

For example, in aspects, the top mold member 110 and the base mold member 120 can include complementary surfaces for ensuring proper alignment of the top mold member 110 and the base mold member 120. As best seen in FIG. 4, the top mold member 110 can include a top mold inner surface 119, opposing a top mold outer surface 118, where the top mold inner surface 119 can be complementarily shaped to a base mold inner surface 124, opposing a base mold outer surface 126. The top mold inner surface 119 can include a top mold non-molding portion 115b and/or a top mold molding portion 115a, in an aspect. In various aspects, the base mold inner surface 124 can include a base mold non-molding portion 125b and/or a base mold molding portion 125a, in aspects. In certain aspects, the top mold non-molding portion 115b of the top mold inner surface 119 and the base mold non-molding portion 125b of the base mold inner surface 124 can have complementary surfaces so that the top mold member 110 and the base mold member 120 can be properly aligned for the molding process, e.g., the proper alignment of the article with the top mold molding portion 115a and/or the base mold molding portion 125a for securing the molding material accurately onto the desired portions of the article. In one aspect, the top mold non-molding portion 115b of the top mold inner surface 119 and the base mold non-molding portion 125b of the base mold inner surface 124 can have complementary curved surfaces, or other non-linear complementary surfaces.

In aspects, one example feature for securing the molding assemblies in the closed configuration can include mechanisms that can facilitate maintaining the top mold member 110 in the top mold closed configuration. In such aspects, the top plate 150 can include one or more top mold securing mechanisms to secure the top mold member 110 in the top mold closed configuration. For instance, as best seen in FIG. 1A, the top plate 150 can include a first top mold securing mechanism 154 and a second top mold securing mechanism 156. For clarity purposes, the second top mold securing mechanism 156 is discussed further; however, it is understood the same features may apply to the first top mold securing mechanism 154.

Figure 6A:
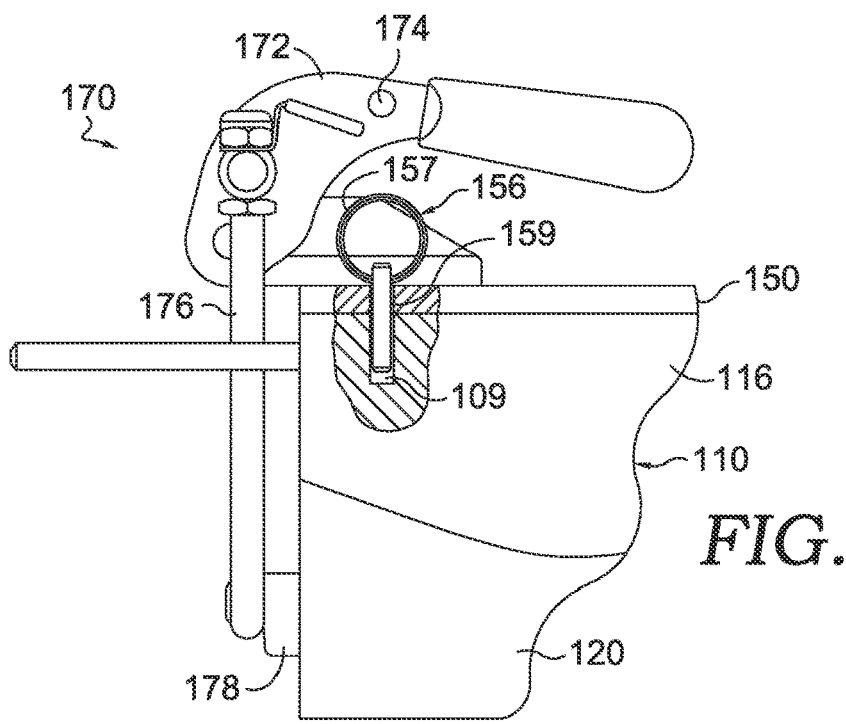
FIGS. 6A and 6B depict a portion of the molding assembly of FIGS. 1A and 1B in the molding assembly closed configuration and the molding assembly securing mechanism, in accordance with aspects hereof.

As best seen in the aspect depicted in FIG. 6A, the second top mold securing mechanism 156 can include a removable locking member 157, e.g., a pin, that can extend through an aperture 159 in the top plate 150 and into a portion or recess 109 of the second top mold portion 116. In such aspects, as discussed above, the top mold member 110 may shift to the top mold closed configuration by shifting the first top mold portion 114 and the second top mold portion 116 towards one another. In aspects, when the recess 109 in the second top mold portion 116 is aligned with the aperture 159 in the top plate 150, the removable locking member 157 can be inserted therethrough to secure the second top mold portion 116 in the appropriate position to maintain the top mold member 110 in the top mold closed configuration. As noted above, in aspects, a similar feature can be present for the first top mold securing mechanism 154 in securing the first top mold portion 114 in the appropriate position to maintain the top mold member 110 in the top mold closed configuration.

Figure 6B:
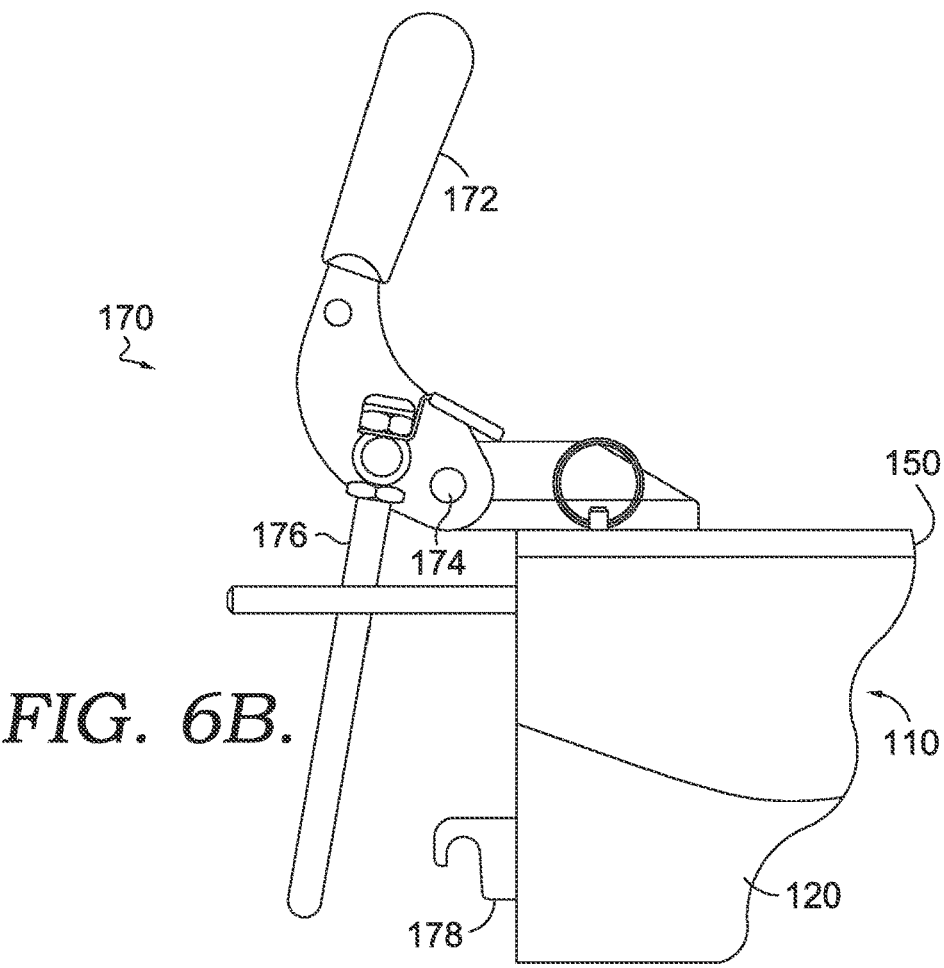

In aspects, another example feature for securing molding assemblies in a closed configuration can include a mechanism to secure the molding assembly 100 in the molding assembly closed configuration. FIGS. 6A and 6B depict one example molding assembly securing mechanism 170. It should be understood that the molding assembly securing mechanism 170 depicted in FIGS. 6A and 6B is just one example securing mechanism and that other types of securing mechanisms may also be contemplated for use in the molding assemblies disclosed herein.

As best seen in FIG. 6B, the molding assembly securing mechanism 170 includes a lever handle 172 that is coupled to the top plate 150, a loop bar 176 extending down towards the base mold member 120, and a catch 178 that is coupled to the base mold member 120. FIG. 6A depicts the molding assembly securing mechanism 170 with the loop bar 176 engaging the catch 178 and where the lever handle 172 has rotated about the pivot point 174 creating a compressive force pressing the top mold member 110 against the base mold member 120, and/or pressing the base mold member 120 up against the top mold member 110, to secure the molding assembly 100 in the molding assembly closed configuration.

In aspects, once an article is secured to the molding assembly and the molding assembly is secured in the molding assembly closed configuration, the article is ready for the molding process. FIG. 7 depicts one example with the lasted footwear upper 200 secured to the molding assembly 100, and the molding assembly 100 secured in the molding assembly closed configuration. In FIG. 7, a portion of the molding assembly 100 and the lasted footwear upper 200 have been cutoff to reveal a molding surface 190.

As can be seen in the aspect depicted in FIG. 7, a portion of the top mold molding portion 115a of the top mold member 110, a portion of the base mold molding portion 125a of the base mold member 120, and at least a plantar portion 222 of the footwear upper 220 cooperatively form at least a part of the molding surface 190 for forming a molded bottom unit attached to the footwear upper 220. In operation, a polymeric composition, such as one of the polymeric compositions discussed above, can be injected into a port 180 in the base mold member 120 to provide the polymeric composition to the molding surface 190 for the molding process, e.g., a direct attach process. In an alternative aspect, in operation, the polymeric composition can be poured into the mold, e.g., the base mold member 120, to provide the polymeric composition to the molding surface 190 for the molding process.

In certain aspects, the molding surface 190 can be adapted to provide any shape or type of bottom unit. For instance, in one aspect, the molding surface 190 can be adapted to provide a unit sole with negative draft sidewalls, e.g., sidewalls that extend out and away from the upper at an angle to create a ground contacting surface that extends out past the upper in one or more regions. In the same or alternate aspects, one or more molding inserts can be positioned within the mold, e.g., in the base mold molding portion 125a, to provide one or more surface features to the molded portion, such as a surface texture and/or embossment of a particular design. In certain aspects, the molding surface 190 can be adapted to provide surface features in the absence of discrete molding inserts.

Figure 9:
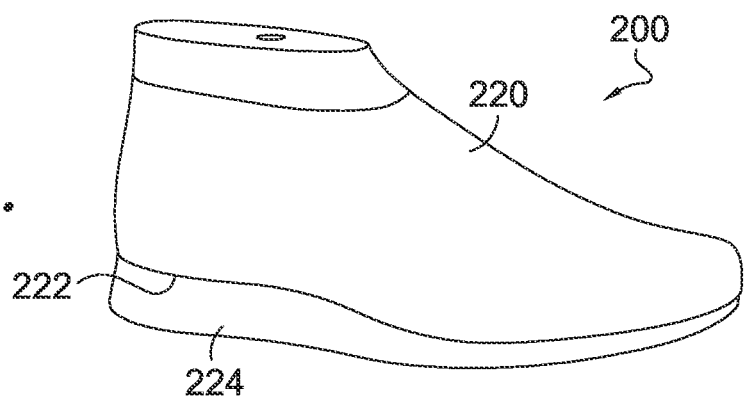
FIG. 9 depicts a lasted footwear upper with at least part of a bottom unit attached to the footwear upper, in accordance with aspects hereof.

FIG. 9 depicts the lasted footwear upper 200 after the molding process and after removal from the molding assembly 100. As can be seen in the aspect depicted in FIG. 9, a bottom unit 224 has been attached onto the plantar portion 222 of the footwear upper 220. It should be understood that the bottom unit 224 depicted in FIG. 9 is just one example style and shape of a bottom unit and that the molding assemblies disclosed herein can be adapted to form a multitude of styles and shapes for bottom units. Further, it should be understood that as discussed above, the bottom unit created by the molding processes described herein can be a midsole, an outsole, an inner sole, or a combination thereof.

Figure 10:
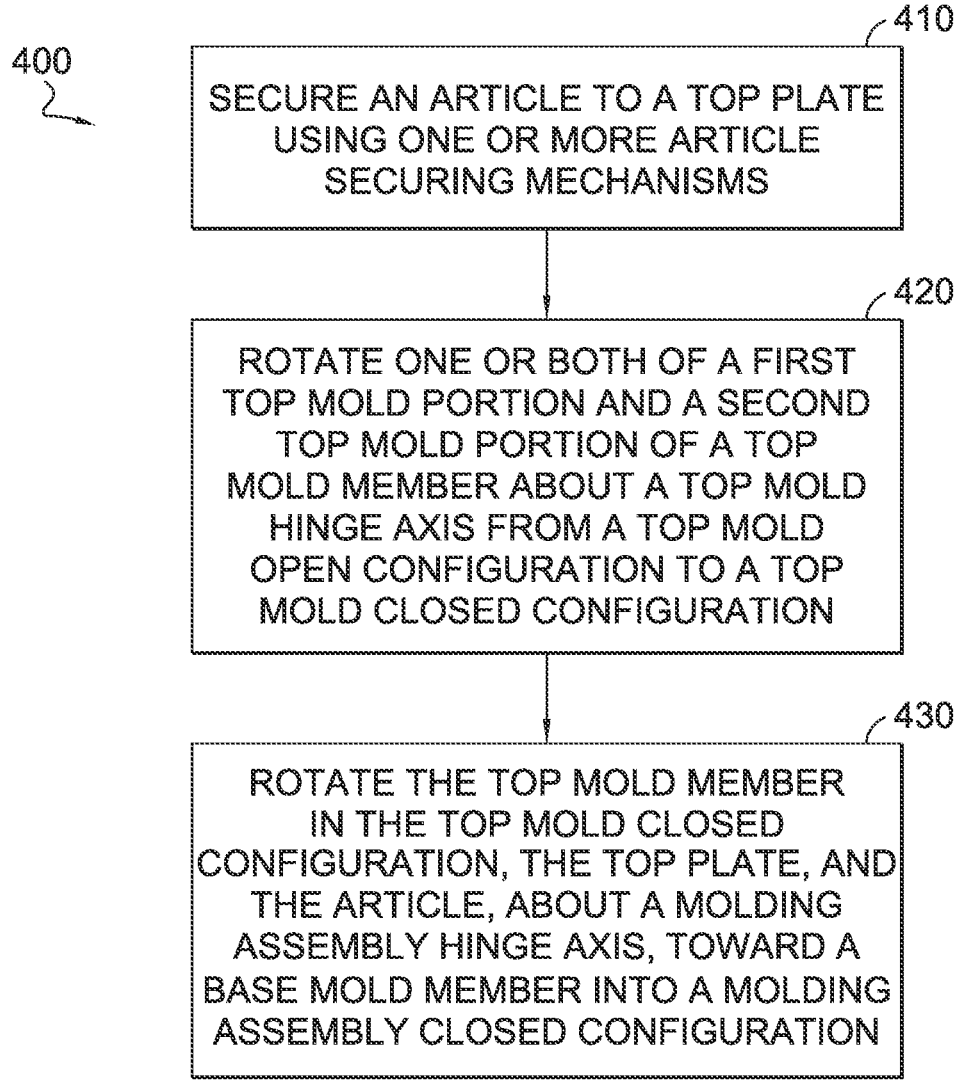
FIG. 10 is a schematic representation of a flow diagram for a method of using a molding assembly, in accordance with aspects hereof.

FIG. 10 is a flow diagram of a method 400 of using a molding assembly. The method 400 can include the step 410 of securing an article to a top plate. In aspects, the article can be any of the articles discussed above, such as the lasted footwear upper 200 discussed above with respect to FIG. 8. In certain aspects, the article can be secured to the top plate using an article securing mechanism, such as the article securing mechanism 160 discussed above with reference to FIGS. 1A and 1B.

The step 420 of the method 400 can include rotating one or both of a first top mold portion and a second top mold portion of a top mold member about a top mold hinge axis from a top mold open configuration to a top mold closed configuration. In various aspects, the top mold member can include any or all of the parameters and features of the top mold member 110 discussed above with respect to FIGS. 1A-7. For instance in certain aspects, the first top mold portion 114 and a second top mold portion 116 can rotate about a top mold hinge axis 142, via a top mold hinge mechanism 140 from the top mold open configuration to the top mold closed configuration. In certain aspects, the top mold securing mechanisms discussed above, e.g., the second top mold securing mechanism 156 can be utilized to secure the top mold member in the top mold closed configuration.

The step 430 of the method 400 can include rotating the top mold member in the top mold closed configuration, the top plate, and the article, about a molding assembly hinge axis, toward a base mold member into a molding assembly closed configuration. In various aspects, the base mold member can include any or all of the parameters of the base mold member 120 discussed above with respect to FIGS. 1A-7. In certain aspects, the top mold member can shift down towards the base mold member by rotating about the molding assembly hinge axis, via a molding assembly hinge mechanism, such as the molding assembly hinge mechanism 130 discussed above with respect to FIGS. 1A and 1B, and into the molding assembly closed configuration. In certain aspects, as discussed above, the molding assembly hinge axis and the top mold hinge axis can be positioned within 15 centimeters of one another.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

While specific elements and steps are discussed in connection to one another, it is understood that any element and/or steps provided herein is contemplated as being combinable with any other elements and/or steps regardless of explicit provision of the same while still being within the scope provided herein. Since many possible embodiments may be made of the disclosure without departing from the scope thereof, it is to be understood that all matter herein set forth or shown in the accompanying drawings is to be interpreted as illustrative and not in a limiting sense.

What is claimed is:

1. A molding assembly, comprising:
   a base mold member;
   a top mold member, the top mold member comprising a first top mold portion and a second top mold portion, wherein the first top mold portion and the second top mold portion are rotatable, about a top mold hinge axis, between a top mold open configuration and a top mold closed configuration; and
   a top plate disposed adjacent the first top mold portion and the second top mold portion and opposite the base mold member, the top plate being in a fixed orientation relative to the top mold hinge axis,
   wherein at least the top mold member is rotatable, about a molding assembly hinge axis, between a molding assembly open configuration and a molding assembly closed configuration, wherein as the top mold member rotates about the molding assembly hinge axis from the first top mold portion and the second top mold portion of the top mold member shift away the base mold member, wherein, when in the molding assembly closed configuration, the base mold member and the top mold member in the top mold closed configuration, are cooperatively adapted to form at least a portion of a mold surface for an article, and wherein the top mold hinge axis and the molding assembly hinge axis are positioned within 15 centimeters of one another.

2. The molding assembly according to claim 1, wherein the molding assembly hinge axis is positioned within 15 centimeters of an end of the base mold member.

3. The molding assembly according to claim 1, further comprising a molding assembly hinge mechanism, wherein the molding assembly hinge mechanism is adapted to rotate at least the top mold member about the molding assembly hinge axis, and wherein at least part of the molding assembly hinge mechanism is coupled to at least part of the base mold member.

4. The molding assembly according to claim 1, further comprising an article securing mechanism, wherein the article securing mechanism and the base mold member are positioned on opposite sides of the top mold member.

5. The molding assembly according to claim 1, wherein, when the top mold member and the base mold member are in the molding assembly open configuration, at least a portion of the top mold member, the top plate, or both are positioned on an opposite side of the molding assembly axis than the base mold member.

6. The molding assembly according to claim 1, wherein the top mold member comprises a top mold member outer surface and a top mold member inner surface, and the base mold member comprises a base mold member outer surface and a base mold member inner surface, wherein the top mold member inner surface comprises a top mold molding portion and a top mold non-molding portion, and the base mold inner surface comprises a base mold molding portion and a base mold non-molding portion, and wherein the top mold non- molding portion of the top mold inner surface and the base mold non-molding portion of the base mold inner surface comprise complementary contacting regions.

7. The molding assembly according to claim 6, wherein the top mold non-molding portion of the top mold inner surface and the base mold non-molding portion of the base mold inner surface comprise complementary curved contacting regions.

8. The molding assembly according to claim 1, wherein the at least a portion of the mold surface for the article comprises at least a portion of an outsole or midsole for an article of footwear.

9. A molding assembly, comprising:
   a base mold member;
   a top mold member, the top mold member comprising a first top mold portion and a second top mold portion, wherein the first top mold portion and the second top mold portion are rotatable, about a top mold hinge axis, between a top mold open configuration and a top mold closed configuration;
   a top plate, the top plate comprising one or more top mold member securing mechanisms adapted to secure the top mold member in the top mold closed configuration, the top plate being in a fixed orientation relative to the top mold hinge axis,
   wherein at least the top mold member is rotatable, about a molding assembly hinge axis, between a molding assembly open configuration and a molding assembly closed configuration, wherein as the top mold member rotates about the molding assembly hinge axis from the first top mold portion and the second top mold portion of the top mold member shift away from the base mold member, wherein, when in the molding assembly closed configuration, the base mold member and the top mold member in the top mold closed configuration, are cooperatively adapted to form at least a portion of a mold surface for an article, and wherein, when in the molding assembly closed configuration, the top mold member is positioned between the top plate and the base mold member.

10. The molding assembly according to claim 9, wherein at least a portion of the one or more top mold member securing mechanisms extends into a recess of the top mold member to secure the top mold member in the top mold closed configuration.

11. The molding assembly according to claim 9, further comprising an article securing mechanism, wherein the article securing mechanism and the base mold member are positioned on opposite sides of the top mold member.

12. The molding assembly according to claim 11, wherein an adjustment plate of the article securing mechanism is vertically shiftable to shift towards and away from the top mold member.

13. The molding assembly according to claim 12, wherein the article securing mechanism further comprises an article engaging component, wherein at least part of the article engaging component is removably coupled to the adjustment plate and adapted to secure the article to the article securing mechanism.

14. The molding assembly according to claim 9, further comprising a molding assembly hinge mechanism, wherein the molding assembly hinge mechanism is adapted to rotate at least the top mold member about the molding assembly hinge axis, and wherein at least part of the molding assembly hinge mechanism is coupled to at least part of the base mold member.

15. A method for utilizing a molding assembly, the method comprising:
   securing an article to a top plate using one or more article securing mechanisms;
   rotating one or both of a first top mold portion and a second top mold portion of a top mold member about a top mold hinge axis, the top mold hinge axis being in a fixed orientation relative to the top plate, from a top mold open configuration to a top mold closed configuration; and
   rotating the top mold member in the top mold closed configuration, the top plate, and the article, about a molding assembly hinge axis, toward a base mold member into a molding assembly closed configuration, wherein the top mold hinge axis and the molding assembly hinge axis are positioned within 15 centimeters of one another; and
   rotating the top mold member from the top mold closed configuration to the top mold open configuration;
   wherein as the top mold member rotates about the molding assembly hinge axis from the top mold closed configuration to the top mold open configuration the first top mold portion and the second top mold portion of the top mold member shift away from the base mold member.

16. The method according to claim 15, wherein the rotating one or both of a first top mold portion and a second top mold portion to the top mold closed configuration comprises rotating the first top mold portion and the second top mold portion towards one another, and towards the article.

17. The method according to claim 15, further comprising: securing the top mold member in the top mold closed configuration using one or more top mold member securing mechanisms.

* * * * *